June 7, 1932. E. MOLDENHAUER 1,861,931
CHANGE SPEED GEARING
Filed May 29, 1929
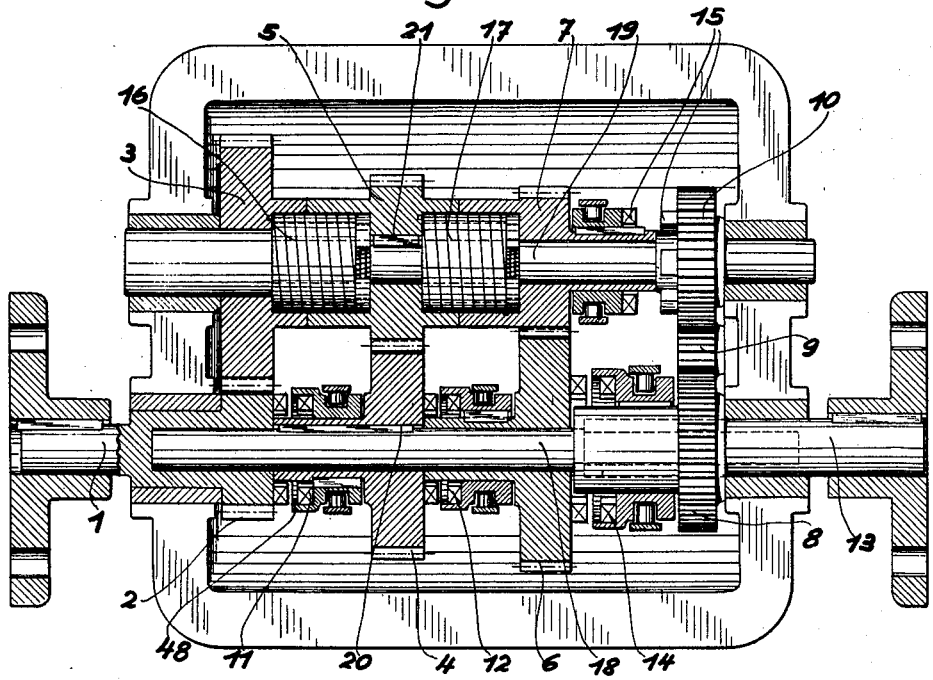
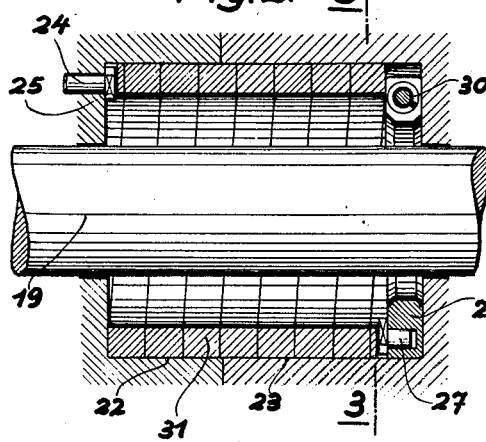
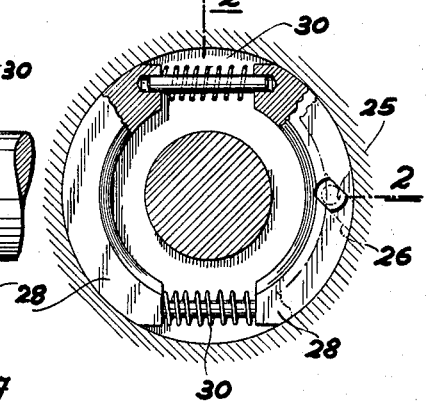
INVENTOR.
Erich Moldenhauer
BY
ATTORNEY Patented June 7, 1932

1,861,931

UNITED STATES PATENT OFFICE

ERICH MOLDENHAUER, OF DUSSELDORF, GERMANY

CHANGE SPEED GEARING

Application filed May 29, 1929, Serial No. 366,783, and in Germany January 14, 1929.

My invention relates to improvements in change speed gearings, and more particularly in change speed gearings used in power operated vehicles.

As now constructed change speed gearings comprising gear wheels are objectionable for the reason that changing from one speed to another, and more particularly changing from a small gear ratio to a large gear ratio, for example from the fourth velocity to the third velocity, or from the third velocity to the second velocity is difficult. The difficulty consists in that when changing from high velocity to low velocity the driving member has a lower velocity than the driven member, and therefore its velocity must first be increased to the velocity of the driven member, before the gear wheels can be thrown into engagement. When using frictional coupling means the said difficulty is obviated, but so far frictional coupling means have not been successful. When using interlocking coupling mechanisms the difficulty is the same as that arising in connection with mechanisms in which the gear wheels are thrown into and out of engagement, because also interlocking clutches can be thrown into engagement only when the velocities of the members to be coupled are alike. When changing from a lower velocity to a higher velocity the angular velocity of the driving member is higher than that of the driven member. By reason of the inertia of the vehicle the velocity of the driven member is practically not changed, and the driving member loses in velocity, so that both velocities become alike thus permitting the gear wheels or clutch members to be thrown into engagement. Thus it is not necessary to increase the velocity of the driving member within the period of time required for changing the gear ratio of the change speed mechanism.

The object of the improvements is to provide a change speed mechanism comprising gear wheels in which the said difficulty is obviated, and with this object in view my invention consists in constructing the mechanism so that when changing the mechanism from a lower velocity to a higher velocity and from a higher velocity to a lower velocity the number of revolutions of the driving member is not smaller than that of the driven member, so that the velocity can be changed in one sense or the other without accelerating the driving member for increasing the velocity thereof. Thus the change speed mechanism can be operated without particular skill.

In the preferred construction I use interlocking clutches, because satisfactory frictional clutches are not known, and because noiseless gear wheels of the desired breadth can be provided if the said gear wheels are continuously in engagement with each other. Therefore my improved speed mechanism works without noise.

For the purpose of explaining the invention an example embodying the same has been shown in the accompanying drawing in which the same letters of reference have been used in all the views to indicate corresponding parts. In said drawing, Fig. 1 is a longitudinal section showing the main parts of the change speed mechanism, Fig. 2 is a sectional elevation on an enlarged scale showing the frictional coupling mechanism, and Fig. 3 is a sectional elevation taken on the line 3—3 of Fig. 2.

The change speed gearing comprises a shaft 1 which is connected with the motor shaft by a friction clutch (not shown), and which is made integral with a pinion 2. In bearing sockets of the shaft 1 and the driven shaft 13 the ends of a shaft 18 are journaled, and parallel to the said shaft 18 an intermediate shaft 19 is mounted in the casing of the gearing. The gear wheels 2—3, 4—5 and 6—7 mounted respectively on the shafts 1, 18 and 19 are respectively in mesh with each other, and gear wheels 8, 9, 10 for the reverse drive are likewise continuously in mesh with each other. Two of the gear wheels, as shown the gear wheels 4 and 5 are keyed respectively to the shafts 18 and 19 by keys 20 and 21. The gear wheels 2 and 4 and the gear wheels 4 and 6 are adapted to be coupled with or disconnected from each other respectively by means of interlocking clutches 11 and 12. The driven shaft 13 is adapted to be coupled with or disconnected from gear wheel 6 by an interlocking clutch 14. Gear wheel 7 is adapted to be connected with and disconnected from gear wheel 10 by an interlocking clutch 15. In a modification of the invention gear wheel 10 is fixed to the shaft 19, while gear wheel 9 is mounted for being thrown into and out of mesh with the gear wheels 8 and 10. The gear wheels 3 and 5 and the gear wheels 5 and 7 are respectively connected with each other by frictional coupling means 16 and 17. As is shown in detail in Figs. 2 and 3 the said coupling means are automatically operative, and they comprise a coiled spring 31 acting as a coupling member. The hubs of the gear wheels are provided with cylindrical concentric chambers 22 and 23 having such a coiled spring 31 embedded therein, the said spring having a cylindrical outer circumference and being made from a band of rectangular cross-section. One end of the said spring is secured to one of the gear wheels by means of a bolt 24 rockingly mounted in a bore of the hub and formed with a flat head 25 engaging in an inclined slot 26 of the end of the spring, the spring being shiftable on the said flat head. The opposite end of the spring is secured in the same way to a friction ring 28 by means of a bolt 27 having a flat head and rockingly mounted in a bore of the ring. In the example shown in the figures the said ring 28 is made in two sections having coiled springs 30 placed between the same, the said springs tending to push the ring sections apart and into frictional engagement with the wall of the cylindrical bore of the hub of the gear wheel. When rotating the gear wheel 3 relatively to the gear wheel 5 in clockwise direction, looking from the left in Fig. 1, as is indicated by the arrow, the gear wheel tends to expand the coiled spring 31, which spring is held at its opposite end by the ring 28 which is in frictional engagement with the wall of the bore 23. Thus the spring is forced all over its length into frictional engagement with the walls of the bores 22 and 23, and it couples the gear wheels with each other. When rotating the gear wheel 3 in the opposite direction, the said gear wheel tends to contract the coiled spring 31, thus disconnecting the gear wheels 3 and 5 and permitting independent rotary movement of the said gear wheels relatively to each other. Therefore the gear wheel 5 can rotate at higher speed than the gear wheel 3, and the gear wheel 7 can rotate at higher velocity than the gear wheel 5 in the direction indicated in Fig. 1, because when rotating the gear wheels in the said direction the coiled spring 31 is out of frictional engagement with the wall of the bores 22 and 23.

The clutches 11, 12, 14 and 15 are operated by any known or preferred means, for example by means of a hand operated lever.

When the clutches 11, 12 and 14 are out of coupling engagement, and the engine is disconnected from the wheels of the vehicle, the change speed gearing runs idle. When setting the clutch 14 into coupling position, after first throwing the friction clutch intermediate the engine and the shaft 1 out of operation, the friction clutch is again operative for coupling shaft 1 with the engine and driving shaft 13. Now the engine is connected through the gear wheels 2, 3, 5, 7, 6 and the clutch 14 with the driven shaft 13, the total gear ratio corresponding to the gear ratio of the gear wheels 2, 3 and 7, 6, and the coiled springs 16 and 17 being in coupling engagement with the walls of the bores 22 and 23. Now the driven shaft 13 is driven at lowermost speed. If now in addition the clutch 11 is thrown into operation, for coupling gear wheel 2 with gear wheel 4, the engine drives gear wheel 5 through the shaft 1, the pinion 2, and the gear wheel 4. Gear wheel 5 is connected by the frictional clutch 17 with gear wheel 7 which therefore drives the shaft 13 through gear wheel 6 and clutch 14. Now the second speed is transmitted to the driven shaft 13, which shaft is rotated at higher velocity than before. The gear wheel 5 rotates in the direction of the arrow shown in Fig. 1 at higher speed than the gear wheel 3. The friction spring clutch 16 is out of frictional engagement with the hubs of the gear wheels 3 and 5, and said friction clutch is inoperative. When throwing the clutch 11 out of coupling position and throwing the clutch 12 into coupling position the power is transmitted to the driven shaft 13 through the gear wheels 2—3, 5—4, the clutch 12, gear wheel 6 and clutch 14. Now the third speed is transmitted to the driven shaft, and the speed of the shaft 13 is further increased. The gear wheel 7 rotates at higher speed than the gear wheel 5, and therefore the friction clutch 17 is released. If now the clutch 11 is again thrown into coupling position, and the clutches 12 and 14 remain in coupling engagement, direct drive is transmitted to the shaft 13, the gear wheels 2, 4 and 6 being coupled with each other and driving the shaft 13 through the clutch 14, the speed of the said shaft being equal to that of the driving shaft 1. The speed of the gear wheel 7 is higher than that of gear wheel 5, and gear wheel 5 rotates at higher velocity than gear wheel 3, so that both friction clutches 16 and 17 are released.

If it is now desired to change the velocity from fourth speed or direct drive to the third speed, or from the third speed to the second speed the shifting of the members of the mechanism is effected in the same way as before, and an inspection of the drawing shows that before throwing the clutch or clutches into coupling engagement the clutch members connected with the driven part, that is the shaft 13, do not rotate at higher velocity than the clutch members connected with the driving shaft, so that when setting the friction clutch intermediate the engine and the shaft 1 into non-coupling position the front or driving part of the mechanism can reduce its speed in the same way as when changing from a lower speed to a higher speed, while the member connected with the rear or driven part of the mechanism maintains its speed, until both parts have the same angular velocity and the clutch members are thrown into coupling engagement. For example, when changing from direct drive or fourth speed to the third speed, only the clutch 11 is thrown out of coupling position, while the members of the clutch 12 remain in coupling engagement. When changing from the third speed to the second speed it is necessary to set the clutch 12 into non-coupling position, and to throw the members of the clutch 11 into coupling engagement. With the parts in the position for transmitting the third speed to the driven shaft gear wheel 4 has a lower angular velocity than gear wheel 2, because the friction clutch 16 couples the gear wheels 3 and 5 which are therefore rotated at the same angular velocity. Therefore gear wheel 4 rotates at lower velocity than gear wheel 2, because the gear ratio from gear wheel 5 to gear wheel 4 is smaller than the gear ratio from gear wheel 3 to gear wheel 2. If therefore the friction clutch between the engine and the shaft 1 is released the circumferential velocity of the gear wheels 2 and 3 is reduced. This is possible because the gear wheel 5 is capable of rotating at higher velocity than gear wheel 3, in which case the spring 16 is out of coupling engagement with the hubs of the said gear wheels. Thus the angular velocity of gear wheel 2 is reduced until its angular velocity is equal to that of gear wheel 4, whereupon the members of the clutch 11 are thrown into coupling engagement. When changing the mechanism from the second to the first speed it is necessary only to set the clutch 11 into non-coupling position, because both springs 16 and 17 couple the gear wheels 3, 5 and 5, 7.

One of the members of the interlocking clutches 11, 12 and 14 may be provided with a cylindrical flange 48 which is in slight frictional engagement with the other coupling member slightly before the coupling members are in positive engagement with each other, so that the time required for equalizing the angular velocity of the members to be coupled is reduced.

While in describing the invention reference has been made to a particular example embodying the same I wish it to be understood that my invention is not limited to the construction of the parts shown in the drawing, and that the construction of the clutches and the manner of operating the same may be made according to different known or preferred principles. Instead of the friction ring 28 other suitable friction members may be provided.

I claim:

1. In a change speed gearing, a drive shaft, a driven shaft alined with the drive shaft, a jack shaft parallel to the drive and driven shafts, two sets of toothed gear wheels mounted on the shafts, each set consisting of a plurality of gear wheels of different diameters, the gear wheels of the sets meshing with each other in pairs and a terminal gear wheel of one of the sets being fixed on the drive shaft, means for driving the driven shaft by another wheel of the same set, coupling members for connecting and disconnecting adjacent gear wheels of said set, and one-way clutch members for gear wheels of the other set adapted to automatically connect the said gear wheels with the driving part upon relative rotation in one direction and to disconnect the same upon relative rotation in the other direction.

2. In a change speed gearing, a drive shaft, a driven shaft alined with the drive shaft, a jack shaft parallel to the drive and driven shafts, two sets of toothed gear wheels mounted on the shafts, each set consisting of a plurality of gear wheels of different diameters, the gear wheels of the sets meshing with each other in pairs and a terminal gear wheel of one of the sets being fixed on the drive shaft, means for driving the driven shaft by another wheel of the same set, coupling members for connecting and disconnecting adjacent gear wheels of one set, and automatically operable one-way clutch members for gear wheels of the other set.

3. In a change speed gearing, a drive shaft, a driven shaft alined with the drive shaft, a jack shaft parallel to the drive and driven shafts, two sets of toothed gear wheels mounted on the shafts, each set consisting of a plurality of gear wheels of different diameters, the gear wheels of the sets meshing with each other in pairs and a terminal gear wheel of one of the sets being fixed on the drive shaft, means for driving the driven shaft by another wheel of the same set, toothed coupling members for connecting and disconnecting adjacent gear wheels of this set, and automatically operable one-way coupling members between adjacent gear wheels of the other set.

4. In a change speed gearing, a drive shaft, a driven shaft alined with the drive shaft, a jack shaft parallel to the drive and driven shafts, two sets of toothed gear wheels mounted on the shafts, each set consisting of a plurality of gear wheels of different diameters, the gear wheels of the sets meshing with each other in pairs and a terminal gear wheel of one of the sets being fixed on the drive shaft, means for driving the driven shaft by another wheel of the same set, toothed coupling members for connecting and disconnecting all the gear wheels of this set, and automatically operable one-way coupling members for gear wheels of the other set.

5. In a change speed gearing, a drive shaft, a driven shaft alined with the drive shaft, a jack shaft parallel to the drive and driven shafts, two sets of toothed gear wheels mounted on the shafts, each set consisting of a plurality of gear wheels of different diameters, the gear wheels of the sets meshing with each other in pairs and a terminal gear wheel of one of the sets being fixed on the drive shaft, means for driving the driven shaft by another wheel of the same set, and toothed coupling members for connecting and disconnecting adjacent gear elements of the one set and automatically operable one-way coupling members between adjacent gear wheels of the other set.

6. In a change speed gearing, a drive shaft, a driven shaft alined with the drive shaft, a jack shaft parallel to the drive and driven shafts, two sets of toothed gear wheels mounted on the shafts, each set consisting of a plurality of gear wheels of different diameters, the gear wheels of the sets meshing with each other in pairs and a terminal gear wheel of one of the sets being fixed on the drive shaft, means for driving the driven shaft by another wheel of the same set, toothed coupling members for connecting and disconnecting adjacent gear elements of the same set, one-way coupling members between adjacent gear wheels of the other set adapted to automatically connect said gear wheels upon relative rotation in one direction and to disconnect the same upon relative rotation in the other direction, wheels for driving the driven means in the reverse direction, and means for moving the toothed coupling members selectively.

In testimony whereof I affix my signature.

ERICH MOLDENHAUER.